(12) United States Patent
Eromaki et al.

(10) Patent No.: US 7,911,773 B2
(45) Date of Patent: Mar. 22, 2011

(54) APPARATUS WITH USER INTERFACE

(75) Inventors: Marko Eromaki, Tampere (FI); Nigel Richardson, Farnham (GB); Brian Davidson, Woking (GB); James Eldon, Fleet Hants (GB)

(73) Assignee: Nokia Corporation, Espoo (FI)

( * ) Notice: Subject to any disclaimer, the term of this patent is extended or adjusted under 35 U.S.C. 154(b) by 233 days.

(21) Appl. No.: 12/317,002

(22) Filed: Dec. 17, 2008

(65) Prior Publication Data

US 2010/0148642 A1 Jun. 17, 2010

(51) Int. Cl.
*G06F 1/16* (2006.01)
(52) U.S. Cl. ......... 361/679.16; 361/679.55; 361/679.56; 455/575.1
(58) Field of Classification Search . 361/679.13–679.16
See application file for complete search history.

(56) References Cited

U.S. PATENT DOCUMENTS

| | | | | |
|---|---|---|---|---|
| 6,466,667 B2* | 10/2002 | Kaschke | .................. | 379/433.13 |
| 6,747,635 B2* | 6/2004 | Ossia | ............................ | 345/169 |
| 6,983,175 B2* | 1/2006 | Kwon | ........................ | 455/575.1 |
| 7,085,596 B2* | 8/2006 | Yu et al. | ...................... | 455/575.1 |
| 7,130,669 B2* | 10/2006 | Moon | ........................ | 455/575.3 |
| 7,199,313 B1* | 4/2007 | Kemppinen | .................. | 200/5 A |
| 7,221,560 B2* | 5/2007 | Varela | ...................... | 361/679.08 |
| 7,616,974 B2* | 11/2009 | Jaakkola | ..................... | 455/575.3 |
| 2003/0003878 A1* | 1/2003 | Bestle | .............................. | 455/90 |
| 2004/0067783 A1* | 4/2004 | Lenchik et al. | ............. | 455/575.1 |
| 2005/0002158 A1* | 1/2005 | Olodort et al. | ................ | 361/683 |
| 2005/0057891 A1* | 3/2005 | Madsen et al. | ................ | 361/680 |
| 2005/0070328 A1* | 3/2005 | Wang et al. | ................. | 455/556.1 |
| 2005/0105256 A1* | 5/2005 | Chuang | .......................... | 361/680 |
| 2006/0035678 A1* | 2/2006 | Jaakkola | ........................ | 455/566 |
| 2006/0164799 A1* | 7/2006 | Varela | ........................... | 361/680 |

FOREIGN PATENT DOCUMENTS

| | | |
|---|---|---|
| WO | WO-2005/119407 A1 | 12/2005 |
| WO | WO 2006/012910 A1 | 2/2006 |
| WO | WO-2006/106384 A2 | 10/2006 |

\* cited by examiner

*Primary Examiner* — Lisa Lea-Edmonds
*Assistant Examiner* — Anthony Q Edwards
(74) *Attorney, Agent, or Firm* — Harrington & Smith

(57) ABSTRACT

A handheld electronic device has a central part comprising a display and two pivotable elements. The pivotable elements are pivotably linked to the central part such that the pivotable elements are moveable between a compacted configuration and an extended configuration. Both of the pivotable elements are stacked on the central part and adjacent to each other when in the compacted configuration, and extend outward from the central part in the extended configuration. The pivotable elements each have a first surface accessible to a user in the compacted configuration. A first set of keys is disposed on the first surfaces. The pivotable elements each also have a second surface that is accessible to the user in the extended configuration but not in the compacted configuration. A second set of keys is disposed on the second surfaces.

14 Claims, 4 Drawing Sheets

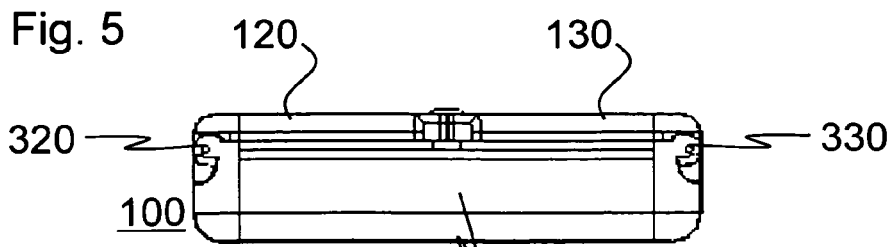
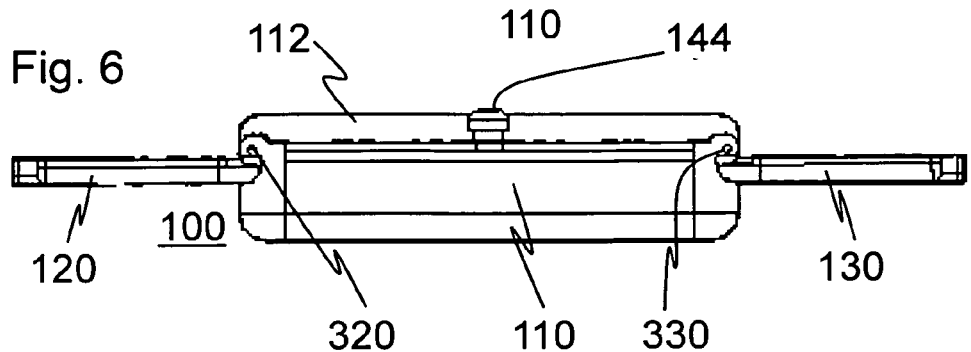
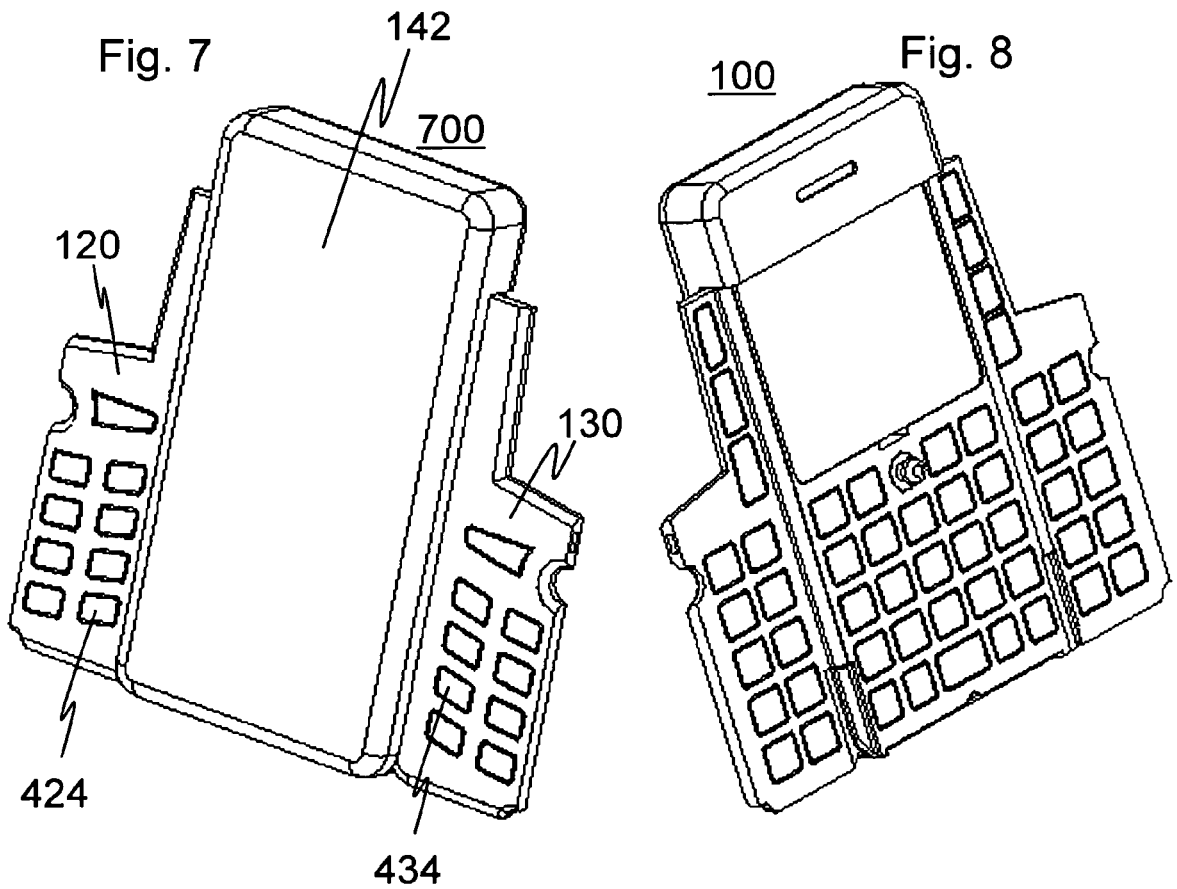

APPARATUS WITH USER INTERFACE

FIELD OF THE INVENTION

The present invention generally relates to an apparatus with a user interface. The invention relates particularly, though not exclusively, to mobile phones with a user interface configured to be movable between an extended and compacted configuration.

BACKGROUND OF THE INVENTION

Battery operated electronic hand-held devices such as mobile phones should generally be convenient to carry along and to use. PDA's and other devices are commonly provided with a user interface that is movable between an opened and closed configuration. For instance, a keypad may be extended by sliding out some or all of the keys or a hinge may be provided in order to enable compacting of the device for easy pocketing and opening up the device so that a display and keypad become conveniently spaced apart.

SUMMARY

According to a first exemplary aspect of the invention there is provided an apparatus, comprising:
  a central part comprising a display; and
  two pivotable elements each pivotably linked to the central part such that the pivotable elements are moveable between a compacted configuration and an extended configuration;
  both of the pivotable elements being stacked on the central part and adjacent to each other when in the compacted configuration;
  both of the pivotable elements extending outward from the central part in the extended configuration;
  the pivotable elements each comprising a first surface accessible to a user in the compacted configuration, the first surfaces comprising a first set of keys;
  the pivotable elements each comprising a second surface accessible to the user in the extended configuration but not in the compacted configuration, the second surfaces comprising a second set of keys.

The display may comprise a first region that is visible to the user in the compacted configuration and a second region that is not visible to the user in the compacted configuration; and both the first and second regions may be visible to the user in the extended configuration.

The central part may comprise a third set of keys aligned between the pivotable elements and the pivotable elements when the pivotable elements are in the compacted configuration and positioned between the keys of the second set when the pivotable elements are in the extended configuration.

At least one of the first and second pivotable elements may:
  overlap with the display in the compacted configuration; and
  comprise at least a portion of the second set of keys sandwiched aligned between the display and the overlapping at least one pivotable element.

The apparatus may further comprise a navigation device attached to the central part and at least one of the first pivotable element and the second pivotable element may define an aperture through which the navigation device is accessible in the compacted configuration.

The display may cover substantially entirely the central part.

The display may be a touch screen.

The pivotable elements may be aligned on a single, perimetric side of the display.

The central part may comprise a battery configured to power the display.

The apparatus may be a handheld electronic device.

The apparatus may further comprise a processor configured to fit content for displaying to the user onto the first region when the pivotable elements are in the compacted configuration and onto the second region when the pivotable elements are in the extended configuration.

The apparatus may further comprise common illumination equipment configured to illuminate at least some keys of the first set in the compacted configuration and at least some keys of the second set in the extended configuration.

The apparatus may further comprise a processor configured to obtain user input from the first set of keys in the compacted configuration and to obtain user input from the second set of keys in the extended configuration.

The apparatus may further comprise flexible cabling configured to pass signals between the central part and the pivotable elements.

According to a second aspect of the invention there is provided an apparatus, comprising:
  a central part means comprising display means; and
  two pivotable element means each pivotably linked to the central part such that the pivotable element means are moveable between a compacted configuration and an extended configuration;
  both of the pivotable element means being stacked on the central part means and adjacent to each other when in the compacted configuration;
  both of the pivotable element means extending outward from the central part in the extended configuration;
  the pivotable element means each comprising first surface accessible to a user in the compacted configuration, the first surfaces comprising a first set of keys; and
  the pivotable element means each comprising a second surface accessible to the user in the extended configuration but not in the compacted configuration, the second surfaces comprising a second set of keys.

Different non-binding exemplary aspects and embodiments of the present invention have been illustrated in the foregoing. Some embodiments may be presented only with reference to certain exemplary aspects of the invention. It should be appreciated that corresponding embodiments may apply to other aspects as well.

BRIEF DESCRIPTION OF THE DRAWINGS

The invention will be described, by way of example only, with reference to the accompanying drawings, in which:

FIG. 5 shows another view of the handheld electronic device of FIG. 1 in the compacted configuration;

FIG. 6 illustrates the handheld electronic device of FIG. 1 from a common view with FIG. 5 but in the extended configuration;

FIG. 7 shows a three-dimensional view of another embodiment of a handheld electronic device;

FIG. 8 shows yet another view of the handheld electronic device of FIG. 1; and

DETAILED DESCRIPTION

In the following description, like numbers denote like elements.

Figure 1:
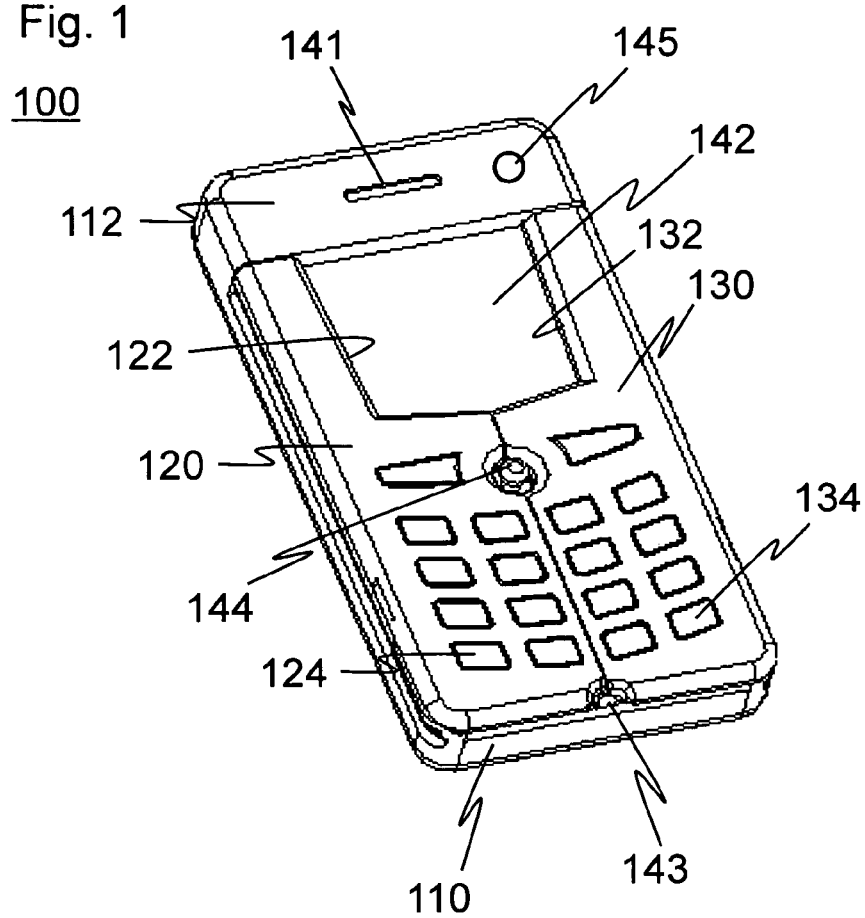
FIG. 1 shows a schematic drawing of a handheld electronic device (in a compacted configuration) according to an embodiment of the invention.

FIG. 1 shows a schematic drawing of an apparatus suited for illustrating some embodiments of the invention. The apparatus of FIG. 1 is a handheld electronic device 100 (in a compacted or closed configuration) according to an embodiment of the invention. The handheld device is a typical battery operated portable device, in this case a mobile phone. The handheld electronic device 100 comprises a main body 110, a flange that is a first pivotable element 120 and another flange that is a second pivotable element 130.

In the compacted configuration shown in FIG. 1, the first and second pivotable elements 120, 130 partly cover the main body 110. The main body 110 has a user interface, some parts of which are at accessible also during the compacted configuration. Namely, the user interface has a speaker 141 at one end of the handheld electronic device 100, a display 142 near the speaker 141. The user interface may further comprise a microphone 143 at an opposite end of the handheld electronic device 100 in comparison to the speaker 141, a navigation device (such as a pointing stick 144, a touchpad or a trackball), and a camera 145 towards the direction from which the handheld electronic device 100 is to be used. The handheld electronic device 100 may further comprise a first set of keys 124, 134 disposed on top surfaces of the first and second pivotable elements, respectively.

FIG. 1 further shows that the pivotable elements 120, 130 extend over opposite perimetric sides of the display 142 and cover most of the length of the handheld electronic device 100. However, at the upper end in FIG. 1, there is a relatively small portion 112 of the main body 110 that will not be covered by the pivotable elements 110, 120. Moreover, the pivotable elements 110, 120 have cut-outs so as to leave most of the display 142 visible in the compacted configuration. Reference sign 132 denotes an edge of the second pivotable element, which edge 132 defines a boundary for the visible part of the display 142 in this compacted configuration.

In this embodiment, the first and second pivotable elements are symmetrical in relation to the longitudinal direction of the handheld electronic device 100. This results in equal usability for both left handed and right handed users, but it is appreciated that the first and second pivotable elements may alternatively be asymmetric. Moreover the shape of the pivotable elements is merely selected to illustrate some possibilities provided by particular embodiments of the invention. For instance, either or both of the pivotable elements 120, 130 may not extend to cover the display at all. In such an implementation the pivotable elements 120,130 may be at the same surface level as the display 142 when the device is in the compact configuration and recessed below the display 142 when in the extended configuration. This implementation has the benefit of reducing the overall thickness of the device in the compact configuration as the pivotable elements 120, 130 are not stacked on top of the display.

There may also be some further keys (not shown) provided on the main body 110 on either or both perimetric sides (e.g. on the left-hand side, right hand side, top or bottom) of the display 142 such that the keys are accessible both in the compacted and extended configuration.

The pivotable elements may have varying widths (when seen as in FIG. 1) such that the pivotable elements do not necessarily abut with each other at the center line of the handheld electronic device 100. Still further, the pivotable elements need not abut with each other at all, but instead the pivotable elements may only partially cover the main body 110 (this embodiment is not shown if the Figures). In this case, a section of the main body may protrude to meet or at least come closer to the surface level of the pivotable elements 120, 130 in the compacted configuration, and the pivotable elements may then abut with the edges of the protruding section of the main body 110.

The pivotable elements 120, 130 restrict the visible area of the display 142. The covered part of the display 142 may thus be switched off in the compacted configuration to save power. Moreover, the pivotable elements 120, 130 may provide protection for the display 142 against scratching and becoming dirty, when in the closed configuration.

The pivotable elements 120, 130 are drawn to narrow towards the upper end of the handheld electronic device 100 (when seen in typical orientation for use). This may facilitate taking a grip of the handheld electronic device 100. Moreover, the upper parts of the pivotable element settle in the compacted configuration against the display 142. Thanks to the cut-out or narrowing section extending to the boundaries 122, 132 for viewing the display, a predetermined area may be provided for viewing the display in the compacted configuration.

The first and second pivotable elements 120, 130 are pivotably connected to two opposite perimetric sides of the main body 110, as will be described with more detail with reference to FIGS. 2 to 6.

The handheld electronic device 100 may have a housing made of plastics, metals, polymers, fiber materials, or any combination thereof.

Figure 2:
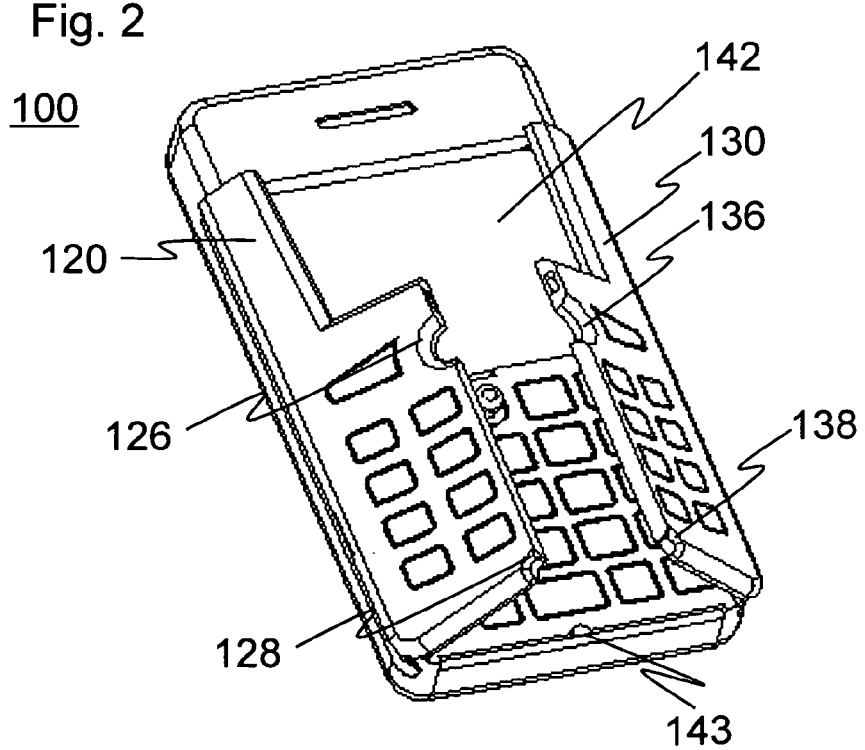
FIG. 2 shows a schematic drawing of a handheld electronic device of FIG. 1 in a partly extended configuration.

FIG. 2 shows the handheld electronic device 100 of FIG. 1 in a partly opened configuration. Both the first and second pivotable elements are opened by roughly 45 degrees from the compacted configuration shown in FIG. 1. FIG. 2 illustrates first cut-outs 126, 136 in the first and second pivotable elements, respectively, for the pointing stick 144 of the main body 110. FIG. 2 further illustrates second cutouts 128, 138 in the first and second pivotable elements, respectively, for the microphone 143 in the main body 110. The first cutouts enable using of the pointing stick 143 also in the compacted configuration as well as in an opened configuration (shown in FIG. 4). The first cutouts are generally provided to enable the use of a navigation device. In this case, the first cutouts 126, 136 are adapted for minor movements needed for using the pointing stick. In another embodiment, in which a trackball or a touchpad is used as a pointing device, the first cutouts may be adapted to enable either or both of the pointing device and of a user's finger to pass through the first cutouts.

Figure 3:
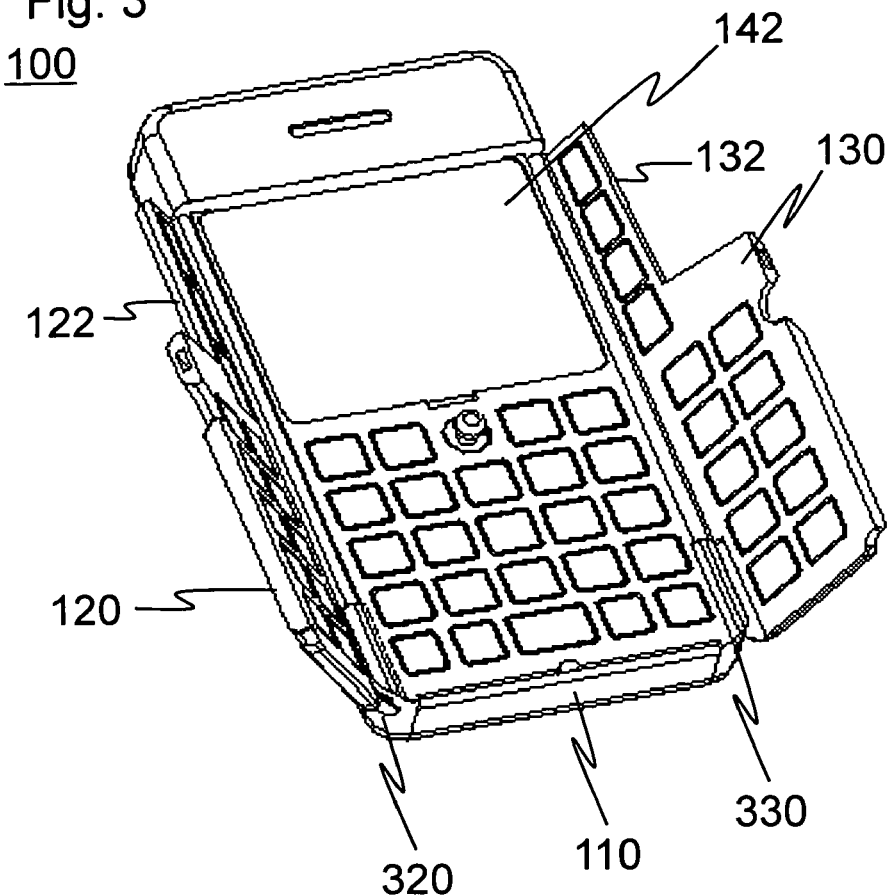
FIG. 3 shows the handheld electronic device of FIG. 1 nearly completely extended.
Figure 4:
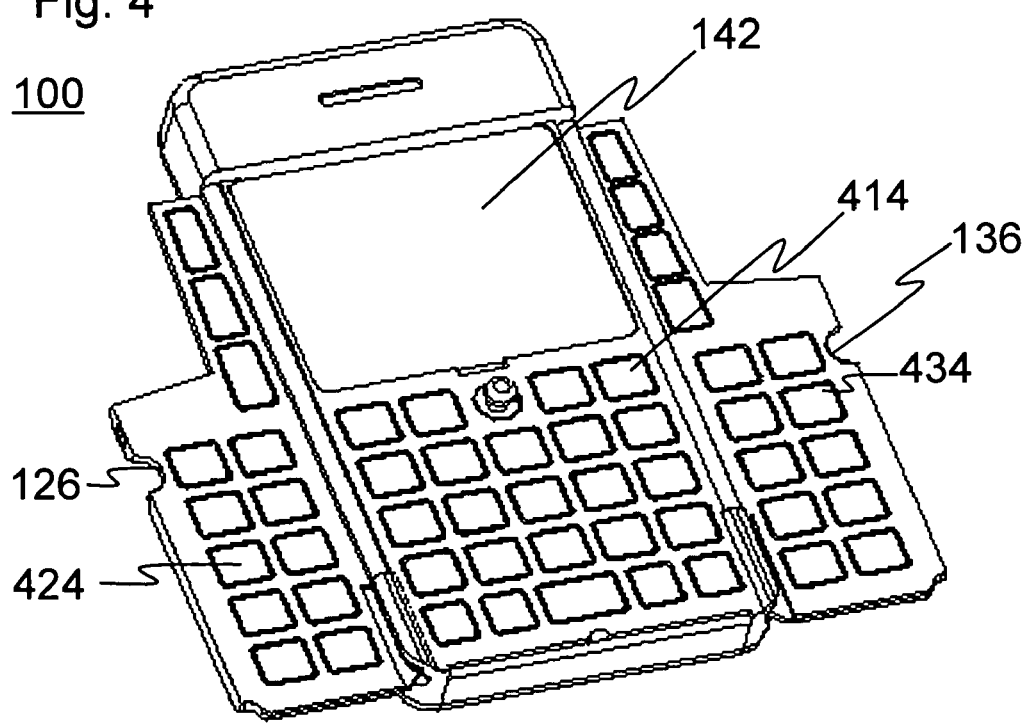
FIG. 4 shows the handheld electronic device of FIG. 1 in an extended configuration.

FIG. 3 shows the handheld electronic device 100 in configuration in which the handheld electronic device 100 is nearly completely extended and FIG. 4 shows the handheld electronic device 100 in the extended configuration. In the extended configuration, the pivotable elements 110, 120 may be pivoted by e.g. 170 to 180 degrees. FIGS. 1 to 4 clearly illustrate that the handheld electronic device 100 may have a first set 124, 134 of keys accessible on the top of the handheld electronic device 100 when the handheld electronic device 100 is in the compacted configuration. A second set of keys 414, 424, 434 may be exposed by opening the pivotable elements 110, 120. The second set of keys may comprise keys on either or both of the pivotable elements. The second set may further comprise keys on the exposed surface of the main body 110. If the pivotable elements 120, 130 do not cover the display 142 they may also leave some of the keys 414 shown in FIG. 4 permanently exposed in addition to or instead of the pointing stick 144 shown in FIG. 1.

FIG. 4 also illustrates that some of the keys 424, 434 of the second set may be provided adjacent or at either or both perimetric sides of the display 142.

In the extended configuration means may be provided to temporarily lock/latch the pivotable elements 120, 130 in that position so as to prevent movement when the user operates any of the keys. The handheld electronic device 100 may also or alternatively comprise a lock or latch for maintaining the pivotable elements 110, 120 in the compacted configuration.

FIG. 5 shows another view of the handheld electronic device 100 in the compacted configuration and FIG. 6 illustrates the handheld electronic device 100 from a common view with FIG. 5 but in an extended configuration. FIGS. 5 and 6 also illustrate first and second hinges 320, 330 for pivotably connecting the first and second pivotable elements 120, 130, respectively, to the main body 110. The hinges may be mounted such that the pivotable elements 110, 120 settle slightly below the surface of the main body 110 when the handheld electronic device 100 is in the extended configuration. The difference in the surface level may help tactile operation with the handheld electronic device 100 as the user may simple detect with fingers the seam between the main body 110 and its surrounding pivotable elements.

In another embodiment the hinges may be mounted such that the pivotable elements 120, 130 settle at the same level as the main body 110 in the extended configuration. In this configuration the tactile operation is helped by the housing of hinges 320, 330.

FIG. 8 shows yet another view of the handheld electronic device 100.

FIG. 7 shows a three-dimensional view of another embodiment of a handheld electronic device, here denoted as a handheld electronic device 700. This device differs from the handheld electronic device 100 shown in other Figs. in that a) the display 142 extends substantially over the entire top or front surface of the handheld electronic device 700 and in that b) the pivotable elements 120, 130 have no keys around the part of the display that is visible in the compacted configuration. Moreover, in this configuration, there is no pointing stick 144 and there is no need to provide an aperture for using the pointing stick 144 while the device is in the compacted configuration (although the aperture is drawn in FIG. 7). An apparatus suited for using in accordance with different embodiments of the invention may be a handheld electronic device such as a mobile phone, portable game station, personal digital assistant, remote controller of an appliance, portable music player, navigator, electric book, portable computer or portable electric translator. Generally, the apparatus may be, for example, a device that benefits from an extendable keyboard or keypad and a display.

It is appreciated from the foregoing description that an apparatus according to the embodiments described in connection with FIGS. 1 and 7 is relatively robust and simple to manufacture. For instance, it may be possible to move two parts over a central part and extended apart from the central part with two relatively long hinge sections. The hinge sections may extend over a distance that is greater than the width of the hinged pivotable element. Thus, it may be possible to manufacture one very long and strong hinge or a number of adjacent hinges which together form a strong connection. This mitigates the problems imposed by laws of mechanics, i.e. that a handheld device with moveable parts and reasonable weight may break if accidentally dropped by the user.

Moreover, it is simple to pass signal paths through a long hinge section e.g. by using a flexible cable or by using a number of adjacent galvanic, capacitive or inductive connections. Especially the non-galvanic connections may incur interference with each other when adjacent contact points are very proximate. Moreover, the structure depicted in FIGS. 1 and 7 enables good access to exterior surfaces of the apparatus thus facilitating cleaning of the apparatus by the user herself. This may also contribute to hygienic and aesthetic considerations in regular use of the apparatus. Moreover, an apparatus as shown in FIGS. 1 and 7 can be relatively simply protected by user replaceable protective covers of e.g. leather which cover can be maintained in place while the apparatus is compacted and extended.

Further still, some embodiments of the invention may provide enable individualizing and separating a phone user interface and PDA user interface on a common apparatus so that their usage may be enhanced for both phone and PDA modes.

Visible screen area may be reduced by changing the apparatus to the compacted configuration. The reduced screen area and resulting smaller area for back-lightning may substantially reduce power consumption and extend battery operating time.

Yet further, it may be possible to provide in the extended configuration a full size qwerty-keyboard with high number of sufficiently large buttons in an ergonomically enhanced layout. Hence, entry of text may be substantially facilitated. Alternatively, or additionally, any other key layouts may be provided in the extended configuration. When none of the keys of the compacted configuration and of the extended configuration is used in the remaining configuration, the key layouts in the two configurations may be freely designed for the usage requirements for each configuration independent of the other configuration.

Moreover, since the keyboard or keypad of the compacted configuration and of the extended configuration is partly provided on opposite sides of a common pivotable element, it may be possible to illuminate the keys of either configuration with a common key illumination with suitably configured light guides and/or light sources. The key illumination may be configured to illuminate keys of both configurations simultaneously even if some of so illuminated keys are not visible to the user.

Particular keys may be provided on two perimetric sides of the display in the extended configuration. These particular keys may by function keys. The function keys may be soft keys with a legend displayed adjacent to the key or fixed function keys. Providing function keys on perimetric sides of the display may be practical for web browsing, for instance.

The main body 110 may provide sufficient rigidity and stiffness for the apparatus, as the main body forms a monoblock structure.

Figure 9:
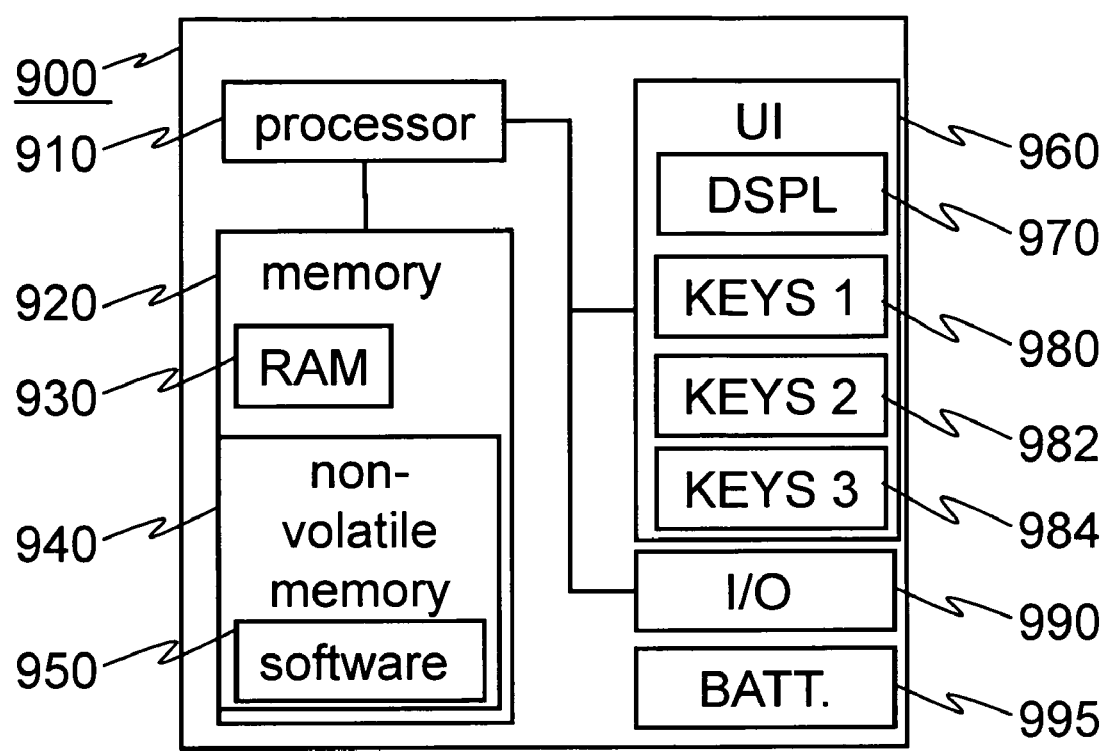
FIG. 9 shows a block diagram of some functional parts relevant for explaining the operation of an apparatus that may operate according to some embodiments of the invention.

FIG. 9 shows a block diagram of some functional parts relevant for explaining the operation of an apparatus 900 that may operate according to some embodiments of the invention. The apparatus 900 comprises a processor 910 for controlling the operation of the apparatus, a memory 920 including a work memory 930 and a non-volatile memory 940. The non-volatile memory 940 is configured to store computer program code or software 950 comprising any of an operating system and computer program code configured to cause the processor on execution to control the apparatus according to an embodiment of the invention. The processor may be configured to use the work memory 930 to temporarily store the computer program code that is being executed. Moreover, the apparatus may comprise a user interface 960 that may include a display 970, one or more sets of keys which are denoted here as 980, 982 and 984. The three different sets of keys may be provided on mutually pivotable elements such as on the first and second pivotable elements and main body as explained e.g. with reference to FIG. 1. The keys may be, for instance, dome buttons or silicone buttons. The apparatus 900 may further comprise a communication unit such as a communication port (e.g. Universal Serial Bus; USB; Bluetooth; or Infrared port), a mobile communication unit (e.g. Global System for Mobile communications, GSM; Wide-Band Code Division Multiple Access, W-CDMA; Personal Digital Communication, PDC; Interim Standard 95, IS-95). Additionally, the apparatus 900 may comprise a disposable or rechargeable battery 995 for powering the apparatus 900 when external power if external power supply is not available.

The processor 910 may be a master control unit MCU. Alternatively, the processor may be a microprocessor, a digital signal processor, an application specific integrated circuit, a field programmable gate array, a microcontroller or a combination of such elements.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. For instance, the operating of an apparatus according to an embodiment of the invention may be facilitated with a mechanism configured to move the apparatus between a compacted and extended configuration, in either or both directions. The mechanism may comprise a resilient member biased by the user or biased by a machine. Alternatively, or additionally, the apparatus may comprise a motorized mechanism to drive the apparatus between the compacted and extended configurations. As such, the foregoing description shall be considered as merely illustrative of the principles of the present invention, and not in limitation thereof. Hence, the scope of the invention is only restricted by the appended patent claims.

We claim:

1. An apparatus, comprising:
   a central part comprising a display; and
   two pivotable elements each pivotably linked to the central part such that the pivotable elements are moveable between a compacted configuration and an extended configuration;
   both of the pivotable elements being stacked on the central part and adjacent to each other when in the compacted configuration;
   both of the pivotable elements extending outward from the central part in the extended configuration;
   the pivotable elements each comprising a first surface accessible to a user in the compacted configuration, the first surfaces comprising a first set of keys; and
   the pivotable elements each comprising a second surface accessible to the user in the extended configuration but not in the compacted configuration, the second surfaces comprising a second set of keys,
   wherein:
   the display comprises a first region that is visible to the user in the compacted configuration and a second region that is not visible to the user in the compacted configuration; and
   both the first and second regions are visible to the user in the extended configuration.

2. An apparatus according to claim 1, wherein the central part comprises a third set of keys aligned between the pivotable elements when the pivotable elements are in the compacted configuration and positioned between the keys of the second set when the pivotable elements are in the extended configuration.

3. An apparatus according to claim 1, wherein at least one of the first and second pivotable elements:
   overlaps with the display in the compacted configuration; and
   comprises at least a portion of the second set of keys aligned between the display and a portion of the overlapping at least one pivotable element.

4. An apparatus according to claim 1, wherein the display covers substantially entirely the central part.

5. An apparatus according to claim 1, wherein the display is a touch screen.

6. An apparatus according to claim 1, wherein the pivotable elements are aligned on a single perimetric side of the display.

7. An apparatus according to claim 1, wherein the central part comprises a battery configured to power the display.

8. An apparatus according to claim 1, wherein the apparatus is a handheld electronic device.

9. An apparatus according to claim 1, further comprising a processor configured to fit content for displaying to the user onto the first region when the pivotable elements are in the compacted configuration and onto the second region when the pivotable elements are in the extended configuration.

10. An apparatus according to claim 1, further comprising common illumination equipment configured to illuminate at least some keys of the first set in the compacted configuration and at least some keys of the second set in the extended configuration.

11. An apparatus according to claim 1, further comprising a processor configured to obtain user input from the first set of keys in the compacted configuration and to obtain user input from the second set of keys in the extended configuration.

12. An apparatus according to claim 1, further comprising flexible cabling configured to pass signals between the central part and the pivotable elements.

13. An apparatus, comprising:
   a central part means comprising display means; and
   two pivotable element means each pivotably linked to the central part such that the pivotable element means are moveable between a compacted configuration and an extended configuration;
   both of the pivotable element means being stacked on the central part means and adjacent to each other when in the compacted configuration;
   both of the pivotable element means extending outward from the central part in the extended configuration;
   the pivotable element means each comprising first surface accessible to a user in the compacted configuration, the first surfaces comprising a first set of keys; and
   the pivotable element means each comprising a second surface accessible to the user in the extended configuration but not in the compacted configuration, the second surfaces comprising a second set of keys, wherein:

the display means comprises a first region that is visible to the user in the compacted configuration and a second region that is not visible to the user in the compacted configuration; and both the first and second regions are visible to the user in the extended configuration.

14. An apparatus comprising:

a central part comprising a display; and two pivotable elements each pivotably linked to the central part such that the pivotable elements are moveable between a compacted configuration and an extended configuration;

both of the pivotable elements being stacked on the central part and adjacent to each other when in the compacted configuration;

both of the pivotable elements extending outward from the central part in the extended configuration;

the pivotable elements each comprising a first surface accessible to a user in the compacted configuration, the first surfaces comprising a first set of keys; and the pivotable elements each comprising a second surface accessible to the user in the extended configuration but not in the compacted configuration, the second surfaces comprising a second set of keys, and a navigation device attached to the central part and at least one of the first pivotable element and the second pivotable element defines an aperture through which the navigation device is accessible in the compacted configuration.

* * * * *